United States Patent

Sinha

[11] Patent Number: 5,961,080
[45] Date of Patent: Oct. 5, 1999

[54] SYSTEM FOR EFFICIENT CONTROL OF FLOW SEPARATION USING A DRIVEN FLEXIBLE WALL

[75] Inventor: Sumon K. Sinha, Oxford, Miss.

[73] Assignee: The University of Mississippi, University, Miss.

[21] Appl. No.: 08/970,514

[22] Filed: Nov. 14, 1997

Related U.S. Application Data

[60] Provisional application No. 60/030,489, Nov. 15, 1996.

[51] Int. Cl.[6] ................................................ B64C 21/00
[52] U.S. Cl. ........................................ 244/204; 244/130
[58] Field of Search .................................. 244/198, 200, 244/203, 204, 130

[56] References Cited

U.S. PATENT DOCUMENTS

| | | | |
|---|---|---|---|
| 3,161,385 | 12/1964 | Kramer | 244/130 |
| 4,516,747 | 5/1985 | Lurz | 244/130 |
| 4,545,553 | 10/1985 | Finke et al. | 244/134 D |
| 5,346,745 | 9/1994 | Bandyopadhyay | 244/204 |
| 5,365,490 | 11/1994 | Katz | 244/204 |

*Primary Examiner*—Galen L. Barefoot
*Attorney, Agent, or Firm*—John P. White; Cooper & Dunham LLP

[57] ABSTRACT

A system to detect and control steady and unsteady boundary layer separation is provided. The system uses an array of transducers under a flexible wall over which the flow occurs. The system operates in two modes: a sensor mode and an actuator mode. In the sensor mode, transducers in the array are used as sensors to obtain a flow-induced wall pressure fluctuation signal characteristic to the incipient separation process. A controller uses the spatial location and frequency content of the sensed signals to determine the location and frequency of excitation needed to delay or defer the flow separation. In the actuator mode, transducers selected by the controller are excited at the aforementioned frequencies, typically immediately upstream of the separation point. This reattaches a separated flow or arrests the progression of separation from its incipient stages.

13 Claims, 10 Drawing Sheets

SYSTEM FOR EFFICIENT CONTROL OF FLOW SEPARATION USING A DRIVEN FLEXIBLE WALL

CROSS-REFERENCE TO RELATED APPLICATIONS

This application claims the benefit of U.S. Provisional Application No. 60/030,489 filed Nov. 15, 1996 which is incorporated herein in its entirety by reference.

GOVERNMENT RIGHTS

The invention described herein was supported by a grant from the United States Government having no. AFOSR-91-0410 and DAAH-04-94-G-0268. The United States Government has certain rights in this invention.

BACKGROUND

1. Field of the Invention

The present application relates to a system and method for the active control of steady and unsteady boundary layer flow separation over surfaces of a structure.

2. Description of the Related Art

Boundary layer flows, such as flows over aircraft wings, are characterized by a thin layer of fluid adjacent a surface of a structure (i.e., the boundary layer) where viscosity of the fluid plays an important role. Outside the boundary layer viscous effects are negligible. The profile of the time-averaged streamwise velocity u(y) in the boundary layer (y being the normal distance from the surface) determines the characteristics of the boundary layer. The velocity at the outer edge of the boundary layer (y=$\delta$, where $\delta$ is the boundary layer thickness) is U (where U is the freestream velocity) and the velocity at the wall is zero (y=0). All boundary layers begin as laminar boundary layers. A laminar boundary layer is characterized by a velocity profile which has a moderate slope du/dy at the surface. After running along the surface a certain distance, a laminar boundary layer usually goes through transition to emerge as a turbulent boundary layer. A turbulent boundary layer has a much larger slope du/dy at the surface. Compared to a laminar boundary layer, a turbulent boundary layer exerts a much higher skin friction drag ($\alpha$du/dy at y=0) on the surface. Delaying transition can therefore reduce skin friction.

A boundary layer separates when it encounters an opposing pressure gradient. At the separation point for steady separation, or immediately upstream of the separation point for unsteady separation the slope du/dy at the surface goes to zero. In order to delay separation, the velocity profile has to be fuller, with a high positive slope du/dy at the surface. Current measures used to delay separation increase skin friction. Conversely, measures taken to delay transition or reduce skin friction in turbulent boundary layers reduce the slope du/dy at the surface and promote separation.

Separation usually results in deterioration of performance of the structure in question. Two common examples where this may be illustrated include, air flow over an aircraft wing and air flow over automobiles. In the aircraft example, for an aircraft wing to generate lift the flow of air over the wing should follow the wing surface. However, when the aircraft is moving at slow speeds and at a high angle of attack, e.g., during take off or landing, the air flow over the top surface of the wing is prone to separate. This can result in a sudden loss in lift close to the ground. Wings of modern aircraft currently incorporate several devices, such as slotted flaps, slats and vortex generators to keep the boundary layer flow attached under these conditions. In the automobile example, flow separation over an automobile leads to the creation of a low pressure zone behind the automobile. This low pressure zone generates aerodynamic pressure drag which at typical highway speeds is the predominant form of resistance. Modern automobiles attempt to overcome aerodynamic drag by streamlining the design of the automobile. Streamlining reduces the severity of flow separation caused by abrupt shape changes which reduces the size of the low pressure zone aft of the flow separation point and hence reduces pressure drag.

As noted, flow separation may be a steady type of separation where the location of the separation point does not significantly move, or the flow separation may be an unsteady type of separation where the location of the separation point varies with time and flow conditions. Dynamic stall on helicopter rotor blades and rotating stall on axial compressor blades are examples of undesirable effects that are initiated by unsteady flow separation. Large oscillatory forces and moments are produced in both types of stall and can result in severe structural damage and erratic performance of the device if unchecked.

Traditional passive flow separation control devices, such as delta wing vortex generators and movable flaps, used to avoid or delay steady flow separation are effective for that purpose but are usually unsuitable or too cumbersome to detect and delay or avoid unsteady flow separation. For example, passive separation control devices typically induce drag even when no flow separation control is needed. Further, in order to delay or avoid unsteady flow separation, an array of passive separation control devices would be needed because the separation point in unsteady flow separation moves.

Attempts to delay or avoid unsteady flow separation have resulted in the development of active flow separation control devices. For example, an array of small imbedded nozzles have been used to eject fluid into the flow. However, in order to actively control the nozzles at the appropriate spatial location and at the appropriate point in time, an array of sensors has to be provided to track the moving separation point. These active flow control systems result in intricate mechanical systems which tend to be complex and difficult to employ. In addition, the power consumed by these systems often does not provide a net power gain because any power savings resulting from drag reduction is lost due to the power consumed by the active flow control system.

Other active systems have employed driven flexible walls for delaying boundary layer transition. However, such active systems are not believed to be capable of controlling flow separation. Separation control necessitates real time detection of the separation point and an avenue for introducing extremely small perturbations into the flow, and should be capable of exploiting natural flow processes to amplify and transform the disturbances to counteract separation even if the boundary layer is already turbulent.

SUMMARY

The present application provides a system that detects incipient boundary layer separation and introduces small disturbances of the appropriate form to counteract the growth of flow separation. The system includes an array of transducers within a flexible housing. The flexible housing is affixed to an aerodynamic surface, such as an aircraft wing, over which the flow occurs so that a flexible wall of the housing remains in contact with the flow. The transducers can be used to vibrate the flexible wall in a direction normal to the wall, or to measure flow induced vibrations of the wall.

As noted above, separation occurs in the presence of an adverse pressure gradient (i.e., pressure opposing the flow). When a boundary layer is about to separate, or has just separated, the wall-normal gradient of the near-wall velocity undergoes inflections. This results in a flow which can be visualized as a free shear layer riding on top of a relatively stagnant or reverse flowing wall-bounded fluid layer. The shear layer is inviscidly unstable to lateral perturbations within a certain frequency range. If some disturbances are present in the flow, as is usually the case, the shear layer selectively amplifies them within this frequency range and modulates the pressure in the fluid layer next to the wall. The modulated pressure is sensed by the appropriate transducers under the flexible outer wall since the wall responds to these pressure fluctuations.

The response of the wall is however also modified by its mechanical properties, such as its mass, stiffness and damping, as well as its interaction with the layer of fluid with which it is in direct contact. The magnitude of the fluctuations increase in the vicinity of the separation point since the shear layer is closest to the wall there. This can be used to detect the instantaneous location of the separation point in an unsteady separating flow.

The primary frequencies present in the transducer signals indicate the frequencies with which energy may be exchanged between the flow and the flexible wall. If the wall is driven at these frequencies, disturbances can be readily introduced into the flow. If these frequencies also coincide with the maximum growth frequencies of the separated shear layer, the rate at which the aforementioned shear layer entrains the surrounding fluid is enhanced. Since some of the fluid is entrained from the wall layer, the pressure in the wall layer reduces causing the shear layer to reattach to the wall.

The flexible housing of the flow sensor control system according to the present application can be made in the form of a thin sheet inner wall and a thin sheet outer wall which can be applied to the surface over which the flow occurs. Using thin sheets permits application of the system to surfaces having small radii of curvature. Thus, the system of the present application may be applied to aircraft wing leading edges, control surfaces, fuselage forebodies, helicopter rotor blades, fan blades, compressor rotors and stators, wind turbine blades, diffuser walls and compressor inlets to name a few applications for the system of the present application. If used on aircraft, the system of the present application can increase the maximum lift of wings, reduce the severity of unsteady separation induced buffeting, and delay the onset of stall. If used on a helicopter rotor blade or wind turbine blade, the system of the present application can detect and delay the onset of dynamic stall thereby reducing the severity of associated unsteady loads on the blade.

The thin sheet construction provides a low weight per unit area of aerodynamic surface, while maintaining the mechanical stability of the flexible housing. Further, the transducers are mounted to, integral with or otherwise associated with the aerodynamic surface so as not to protrude from the flexible housing so that the system is virtually non-intrusive when not actuated and is substantially immune from being damaged by debris in the flow stream.

The flow separation control system also tracks the separation point, so that it can be used to direct extremely small level perturbations effectively to the desired region of the boundary layer at the proper instant in time that minimizes the level of perturbation needed to achieve the desired result. As a result, the system of the present application is energy efficient.

BRIEF DESCRIPTION OF THE DRAWINGS

Preferred embodiments of the invention are described hereinbelow with reference to the drawings wherein.

DETAILED DESCRIPTION

The present application provides an active flow separation control system that locally interacts with air (or other gas or liquid) flowing over it, and is capable of operating in two modes: a sensor mode and an actuator mode. In the sensor mode, the system detects incipient steady and unsteady boundary layer flow separation, and in the actuator mode, the system introduce small disturbances into the flow with sufficient characteristics to counteract (including substantially preventing or delaying) the growth of flow separation.

The system includes an array of transducers within a flexible housing that can be affixed to a surface of a structure, such as an aircraft wing, over which boundary layer flow occurs so that at least an outer surface of the flexible wall remains in contact with the flow. In the sensor mode, the transducers are used to measure flow induced vibrations of the outer wall of the flexible housing. In the actuator mode, the transducers are used to vibrate the outer surface of the flexible housing in a direction that is normal to the housing to introduce small disturbances into the flow.

Figure 1B:
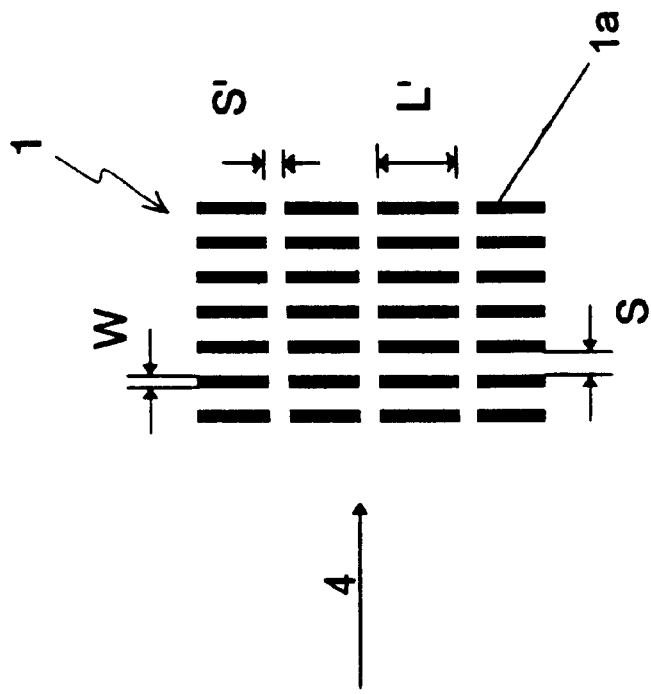
FIG. 1b is a top plan view showing an alternative embodiment for the transducer array used in the flow separation control system of the present application.
Figure 1A:
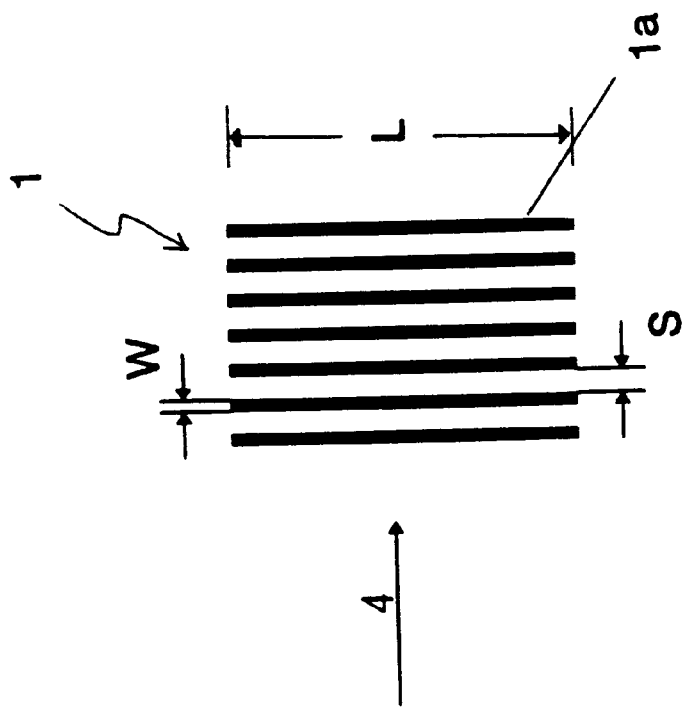
FIG. 1a is a top plan view showing a transducer array used in the flow separation control system of the present application.
Figure 2:
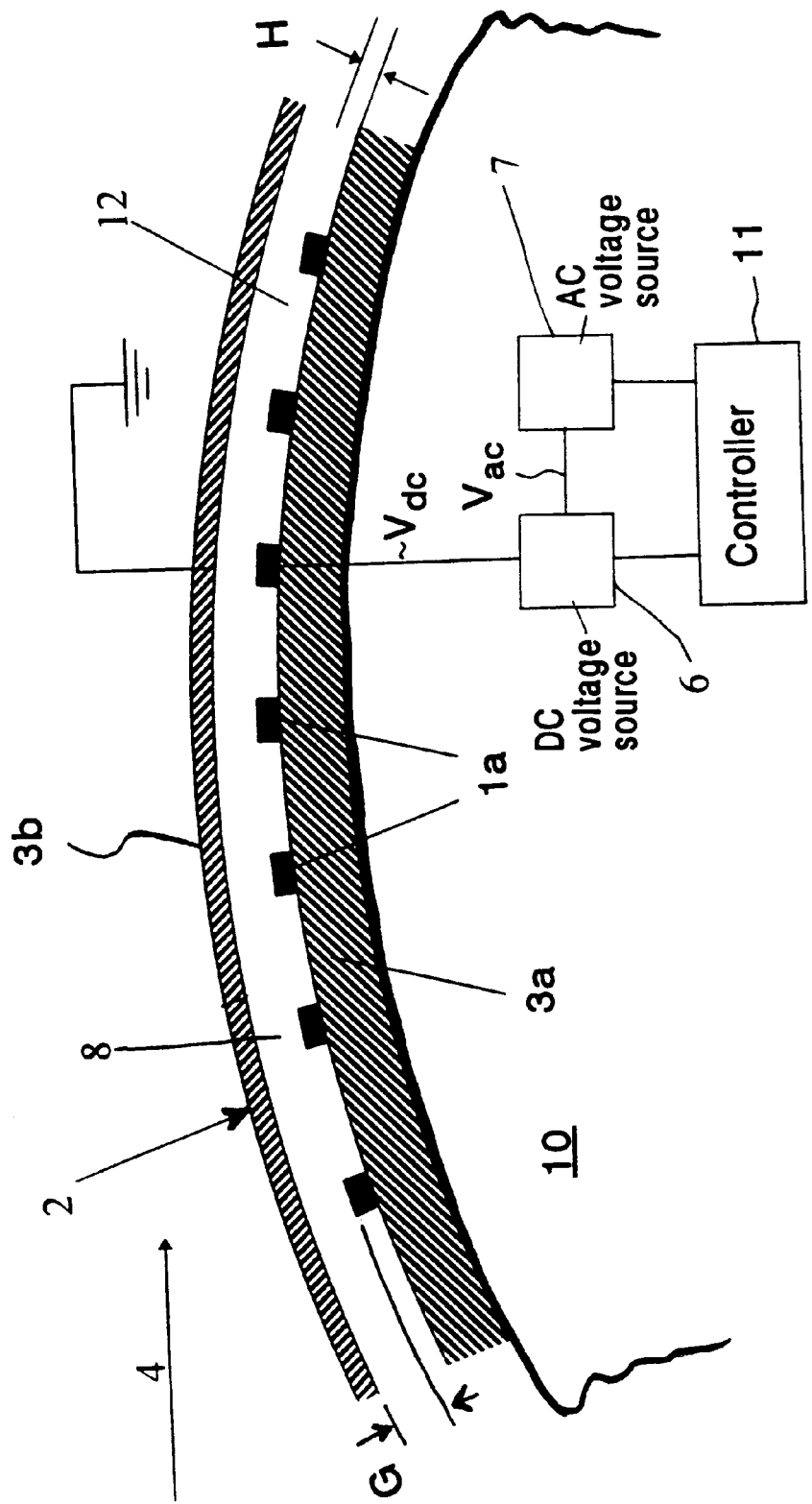
FIG. 2 is a cross-sectional view of an example of the flow separation control system of the present application, illustrating a flexible wall and a transducer array associated with an aerodynamic surface.

Referring to FIGS. 1a and 2, the flow separation control system of the present application includes a transducer array 1 and a flexible housing 2. The transducer array 1 includes a plurality of transducers (or conductive strips) 1a each having a width W and being spaced apart by a distance S relative to the flow 4. The preferred orientation of the strips with respect to the flow is shown in FIG. 1. Preferably, the spacing S between the transducers combined with the width W of the transducers in the direction of the flow ranging from about one-quarter to about one and one-half times the thickness of the boundary layer immediately upstream of the separation point. Preferably, S and W are equal to ensure isolation between transducers.

In FIG. 1a the transducers are shown having a length L and width W. However, the length and width for each transducer in the array can vary depending on the surface over which boundary layer flow is to be controlled. FIG. 1b illustrates an alternative configuration for the transducer array. In this embodiment, the transducers can be arrayed in rows and columns. Preferably, the width S' between columns is the same as the width S between rows to ensure transducer isolation. Further, the lengths of the segments L' vary depending upon, for example, the variation of the flow in the spanwise direction. Thus, the size and configuration of the array, as well as the size and configuration of the transducers in the array may vary depending on, for example, the surface over which boundary layer flow is to be controlled and flow conditions.

In addition, different types of transducers may be employed for this purpose, including, for example, piezoelectric, electrostatic, pneumatic, electromagnetic, or any combination thereof.

The flexible housing 2 preferably has a dielectric inner wall (or substrate) 3a capable of being mounted to the structure surface and to follow the contours of the surface, and an flexible outer wall 3b. The outer wall 3b is made from a thin flexible dielectric sheet and has a conductive portion that is preferably formed by depositing aluminum onto an outer surface of the sheet. The outer wall 3b can have a thickness ranging from between about 5 microns and about 50 microns, and is preferably 20 microns thick.

To form the transducer array, the transducers 1a may be mounted on or imbedded in the inner wall 3a of the flexible housing 2, as shown in FIG. 2. Alternatively, the transducers may be made by etching a flexible copper clad plastic (polyamide) sheet to form a thin flexible stack of sheets. In this configuration, the back of the etched copper clad sheet forms the inner wall 3a of the flexible housing 2 and the flexible outer wall 3b is secured to the periphery of the inner wall 3a with, for example, an adhesive. However, other fabrication techniques, such as micro-fabrication, may be employed to form the transducer array, the transducers, or the transducers in combination with the inner wall. Each transducer is coupled to a DC voltage source 6 and an AC voltage source which are coupled to a controller 11. The controller may be a computer programmed to receive signals sensed when in the sensor mode and to process information from the sensed signals to determine the characteristic outer wall oscillation frequencies and the instantaneous location of the separation point. The controller then switches to the actuator mode to excite one or more of the transducers in the array with an AC voltage having a characteristic sensed frequency and sufficient amplitude to cause vibration in the outer wall 3b that counteracts the flow separation. The amplitude of oscillation of the outer wall caused by the electrostatic force can range from between about 0.1 micron and about 3.0 microns, and the frequency of the oscillations can range from between about 100 Hz and about 10 kHz. Thus, the system of the present application is preferably capable of controlling boundary layer separation in real time. A controller that utilizes neural network technology may be used to perform such real time control of boundary layer separation.

The flexible housing can be secured to the surface of the structure, e.g., the surface of a rotor blade or a wing, preferably by adhesive. However, other known techniques may be used to secure the housing to the structure surface.

In operation, the system of the present application applies a DC bias voltage $V_{dc}$, between the conductive outer surface of the outer wall 3b and the transducers 1a to electrostatically hold the outer wall 3b in a position relative to the inner wall 3a and each transducer 1a, and thus controlling the thickness of an air gap 8 between the outer wall 3b and the transducers 1a, and the outer wall and the inner wall 3a. Typically, the outer wall 3b tends to lift or move away from the inner wall due to the suction created by the flow 4. Thus, the bias voltage $V_{dc}$ has to be sufficient to prevent the air gap 8 from exceeding a predefined distance G, which can range from between about 0.05 microns and about 4 microns and is preferably 1 micron. The maximum permissible bias voltage may vary due to the electrical breakdown characteristics of the flexible outer wall 3b and the air gap 8.

In the actuator mode, to introduce small disturbances into the flow an AC voltage $V_{ac}$ is superimposed on the DC bias voltage $V_{dc}$ applied to one or more of the transducers 1a. When the AC voltage is applied, portions of the outer wall 3b adjacent an excited transducer 1a will vibrate in response to the AC signal applied to the transducer. The frequency of oscillation of the vibrating portions of the outer wall generally has two main components: one at the frequency f of the AC voltage, and the other at a frequency that is twice the AC voltage frequency 2f. The reason there are two main components is that is that irrespective of the polarity of the voltage applied across each transducer 1a and the outer wall 3b, the electrostatic force therebetween is an attractive force. The restoring repulsive force is provided by the compression of air in gap 8. The instantaneous magnitude of this electrostatic force varies with the AC voltage. The ratio of the force $F_2$ at frequency 2f to the force $F_1$ at frequency f is proportional to the square of the ratio of the AC voltage $V_{ac}$ to the bias voltage $V_{dc}$ and is expressed as:

$$F_2/F_1 \propto (V_{ac}/V_{dc})^2$$

Each transducer 1a can be independently energized so that a portion of the outer wall 3b adjacent each transducer 1a can be excited (oscillated) substantially independently. Further, more than one transducer can be actuated at the same time at different frequencies and phases, thereby permitting the generation of any desired surface oscillation pattern (including standing waves and traveling waves) of the outer wall. The effective stiffness of the vibrating outer wall 3b can be controlled by adjusting the bias voltage $V_{dc}$ and/or by increasing/decreasing the height H of the transducers. As noted, in the actuator mode, the amplitude of surface oscillations can be varied by controlling the AC voltage $V_{ac}$.

Figure 3:
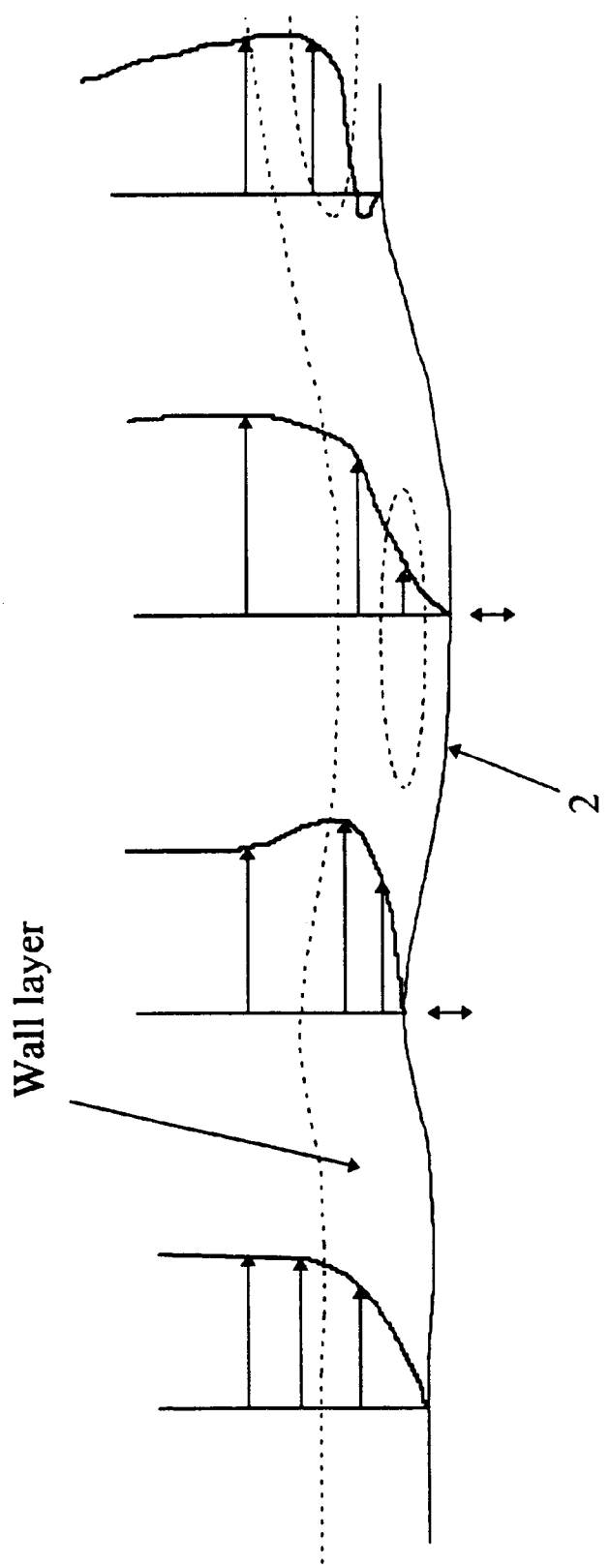
FIG. 3 is a schematic representation illustrating how the oscillation of the flexible outer wall.

Continuing to refer to FIG. 2, in the sensor mode, because segments 12 between the inner wall 3a and the outer wall 3b and bounded by the transducers have larger air gaps 12, and because these segments 12 are not directly energized by the bias voltage, these un-energized sections 12 respond more readily to surface pressure fluctuations which permits the system to detect points on the outer wall 3b where initial flow separation occurs. Thus, in the sensor mode the transducer array operates as an array of, for example, distributed microphones or wall-pressure fluctuation sensors. When the flow sensor control system of the present application is mounted on a surface of a structure, the flow of air over the outer wall 3b causes portions of the wall adjacent the segments 12 to oscillate. The frequency and mode of these oscillations depend on the coupling of the flow with the outer wall. For example, the waviness induced by the wall can result in inflections in the wall layer velocity profile, as shown in FIG. 3. These inflectional profiles have characteristic frequencies which would also be sensed by the wall so that induce fluctuations in the air gap between the outer wall and the transducers can be measured. That is, the induced fluctuations result in variations in the electrical capacitance between the outer wall 3b and the transducers 1a. When the DC bias voltage $V_{dc}$ is applied in absence of AC voltage (i.e., $V_{ac}=0$), the bias voltage between a transducer and the outer wall fluctuates in response to sensed pressure changes. This fluctuating voltage signal can be extracted from the bias voltage by, for example, blocking the DC voltage. Typically, the fluctuating voltage signal contains information about the flow, and can be used for determining the frequency, spatial location, temporal phase and wave number for actuation, so as to obtain the desired counteracting effect.

In the actuator mode, the controller controls the AC voltage source (or sources) to apply to one or more transducers in the array at a point upstream from the point of incipient flow separation an AC voltage having amplitude and frequency characteristics sufficient to cause vibrations or oscillations of the outer wall. The amplitude of oscillation of the outer wall caused by the electrostatic force can range from between about 0.1 micron and about 3.0 microns and the frequency of the oscillations can range from between about 100 Hz and about 10 kHz. The oscillations in the outer wall effect the fluid layer very close to the wall, as shown in FIG. 3. If the forcing frequency coincides with the instability frequency of the boundary layer, the disturbances to the incipient separating boundary layer are amplified and convected by the flow. If the boundary layer is resonantly excited by the disturbances introduced into the flow separation is delayed. In some instances a single frequency can be used to delay or avoid flow separation, and in other instances a combination of frequencies present in the sensed signal can be used to generate the disturbances to be introduced into the flow to delay or avoid flow separation. Preferably, the disturbances are introduced at a point of about one to two boundary layer thicknesses upstream of the separation point.

The flow separation control system of the present application described can be utilized for controlling steady and unsteady separation on a surface of a structure using a sensor-actuator feedback loop configuration.

The transducers in the array preferably span the area over which separation can occur. In the case of three-dimensional separation, each transducer can be further segmented, thereby creating a checkerboard pattern of transducers. Signals from the appropriate transducer elements can be acquired and analyzed to determine the spatial and temporal structure of naturally occurring flow-induced wall pressure fluctuations. This can be achieved by comparing the acquired signals to those that have been found to occur during the onset of flow separation. Once the location and time of the separation have been estimated, the appropriate transducer elements are used as actuators. Perturbations can then be introduced into the separating (or just separated) region of the boundary layer in order to delay (or avoid) the separation.

The experimentational examples to follow are provided for illustration purposes and are not intended to limit the scope of the application. There are two sets of examples the first from boundary flow separation occurring in the laminar Further, for the examples the ratio of the voltages $V_{ac}/V_{dc}$ is less than or equal to 0.1 so that in these examples the frequency of oscillation (or motion) of the outer wall 3b is about the same as the frequency of the AC voltage.

Figure 4:
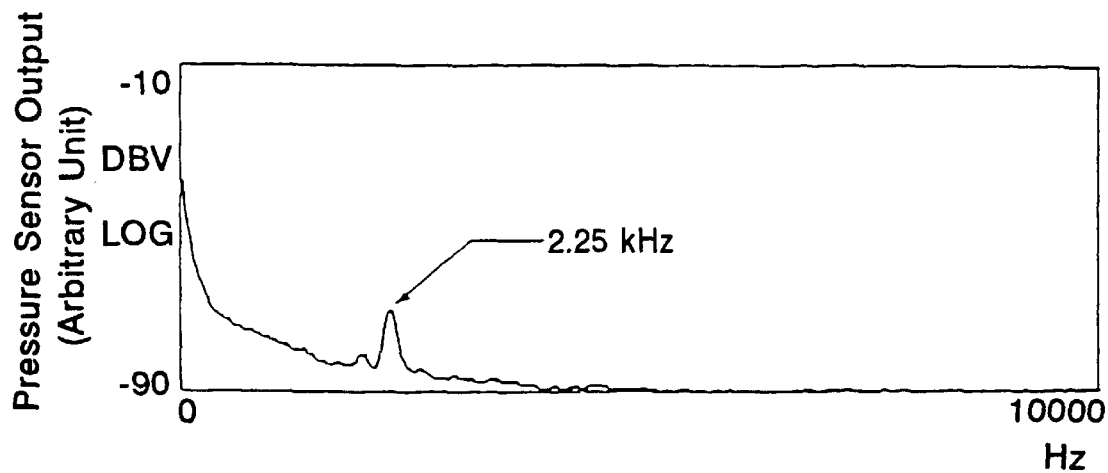
FIG. 4 is a graph of pressure sensor output verses signal frequency, illustrating a spectrum of sensor signals obtained for flow over a 152 mm diameter cylinder in cross flow with a diameter based Reynolds number of 150,000.
Figure 5:
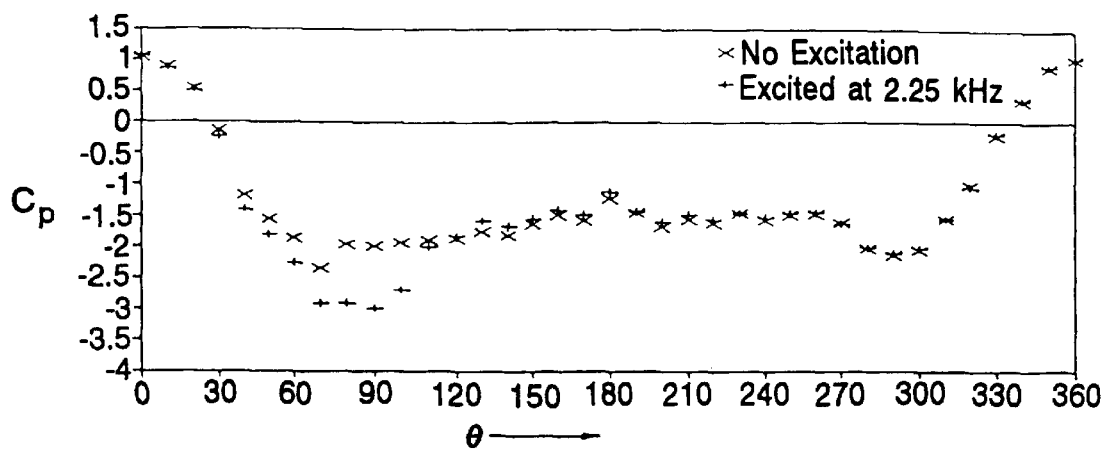
FIG. 5 is a graph showing non-dimensionalized surface static pressure distributions ($C_p$) for excited and unexcited conditions for a flow with a Reynolds number of 150,000 over a 152 mm diameter cylinder as a function of angular position.
Figure 6:
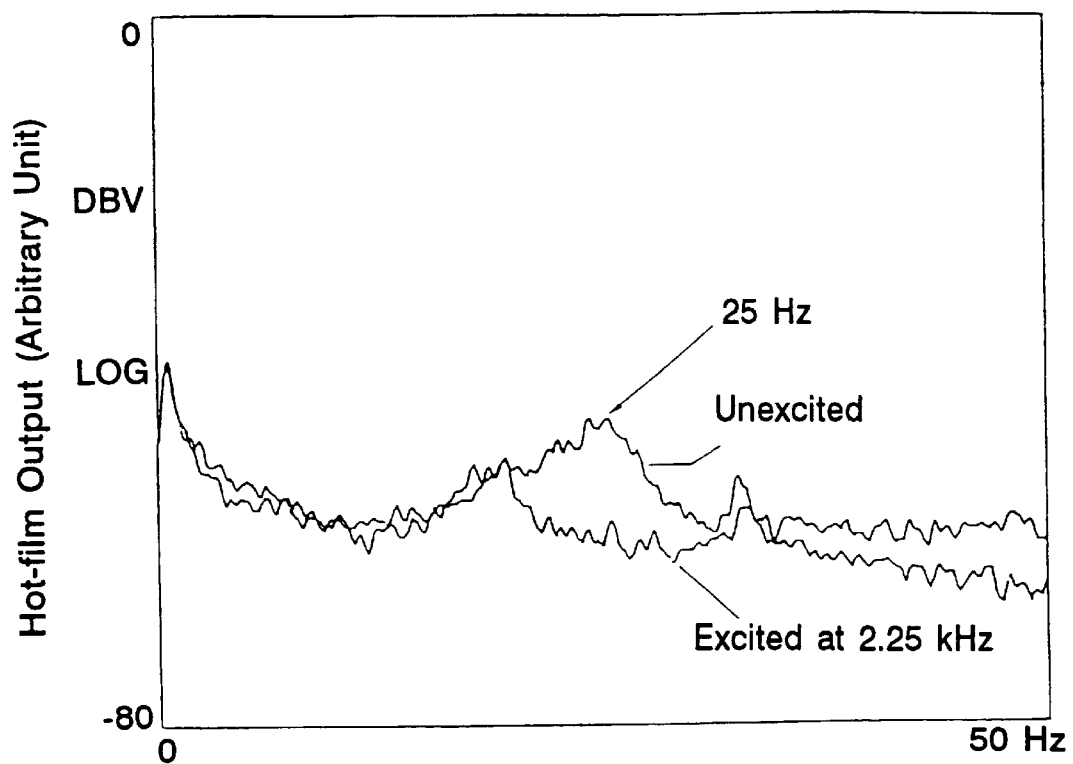
FIG. 6 is a graph showing suppression of vortex shedding in the wake of the cylinder of FIG. 5.

In a first set of examples, experiments were conducted in a low-speed subsonic wind-tunnel having a maximum velocity of about 15 m/s. A 152 mm diameter circular cylinder was placed in crossflow in the tunnel test section. The flow separation control system of the present application with 1.6 mm wide transducers and with 1.6 mm spacing between the transducers was mounted on the top surface of the cylinder. The transducers were oriented parallel to the cylinder axis. Measurements were made with a diameter based Reynolds number of 154,000. Here the Reynolds number (R) is represented by the following equation:

$$R=U\times(D/v)$$

where U is the freestream velocity, D is the diameter of the cylinder, and v the kinematic viscosity of the fluid. Signals from one of the transducers upstream of the mean separation point, showed a peak at 2.25 kHz. The mean separation point was located at about 78 degrees from the forward stagnation point of the cylinder. In the actuator mode, two transducers located between 72–74 degrees from the forward stagnation point were excited in phase at 2.25 kHz, the separation point moved downstream to about 106 degrees. These results are shown in FIGS. 4 and 5. The movement of the separation point is seen in the mean pressure distribution ($C_p$) plot. The mean pressure distribution is defined by the expression:

$$C_p=(p-p_\infty)/0.5\ \rho U^2$$

where ($p-p_\infty$) is the surface pressure with reference to the upstream static pressure and $\rho$ is the fluid density. Integration of the mean pressure profiles showed a reduction in pressure drag of about 12.4%. In addition to the delay in separation, a hot wire velocity measurement in the wake showed that the vortex shedding frequency of 25 Hz was severely attenuated (FIG. 6).

Figure 7:
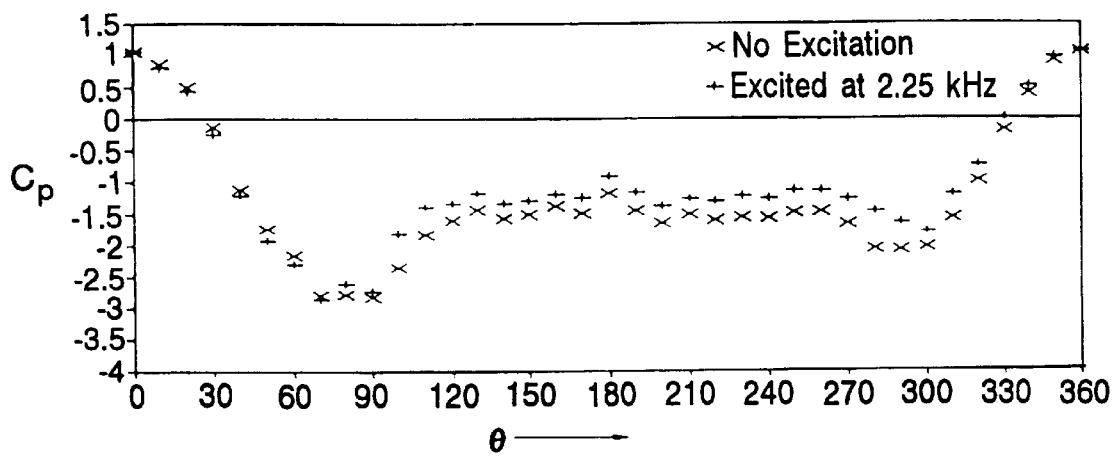
FIG. 7 is a graph showing non-dimensionalized surface static pressure ($C_p$) distributions for excited and unexcited conditions for tripped flow with a Reynolds number of 150,000 over a 152 mm diameter cylinder as a function of angular position.
Figure 8:
FIG. 8 is a photograph illustrating smoke flow visualization of separation delay for the untripped flow over the cylinder with a Reynolds number of 150,000, where unexcited flow is from left to right.
Figure 9:
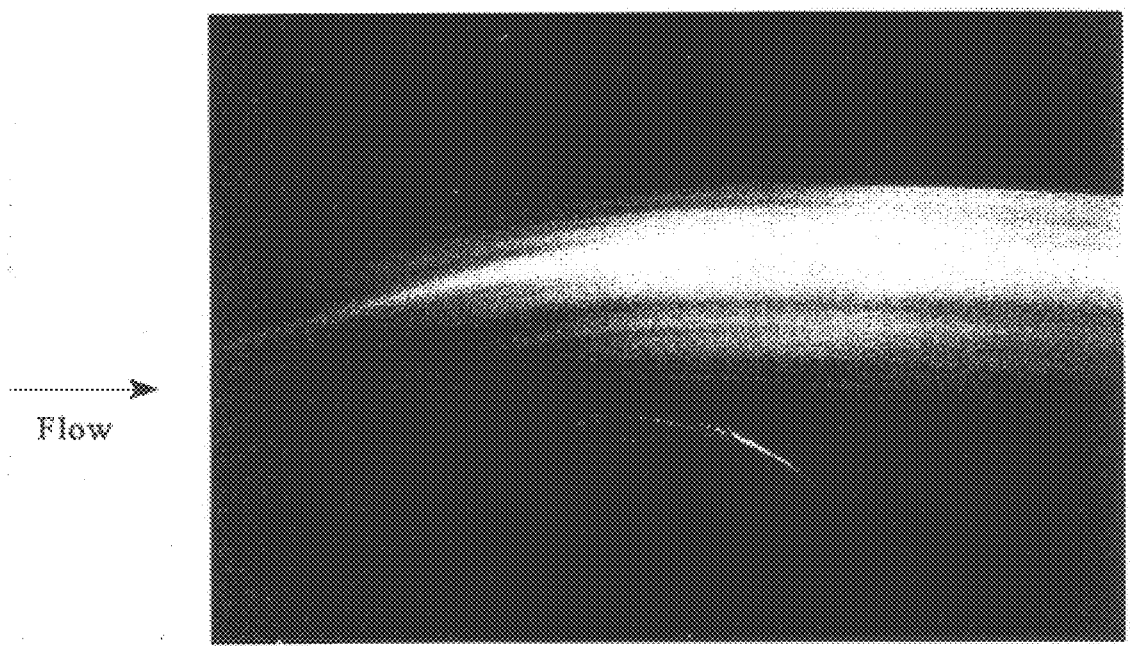
FIG. 9 is a photograph illustrating smoke flow visualization of separation delay for the untripped flow over the cylinder with a Reynolds number of 150,000, where the flow is from left to right and is excited at 2.25 kHz for angular positions between 72 and 74 degrees.
Figure 10:
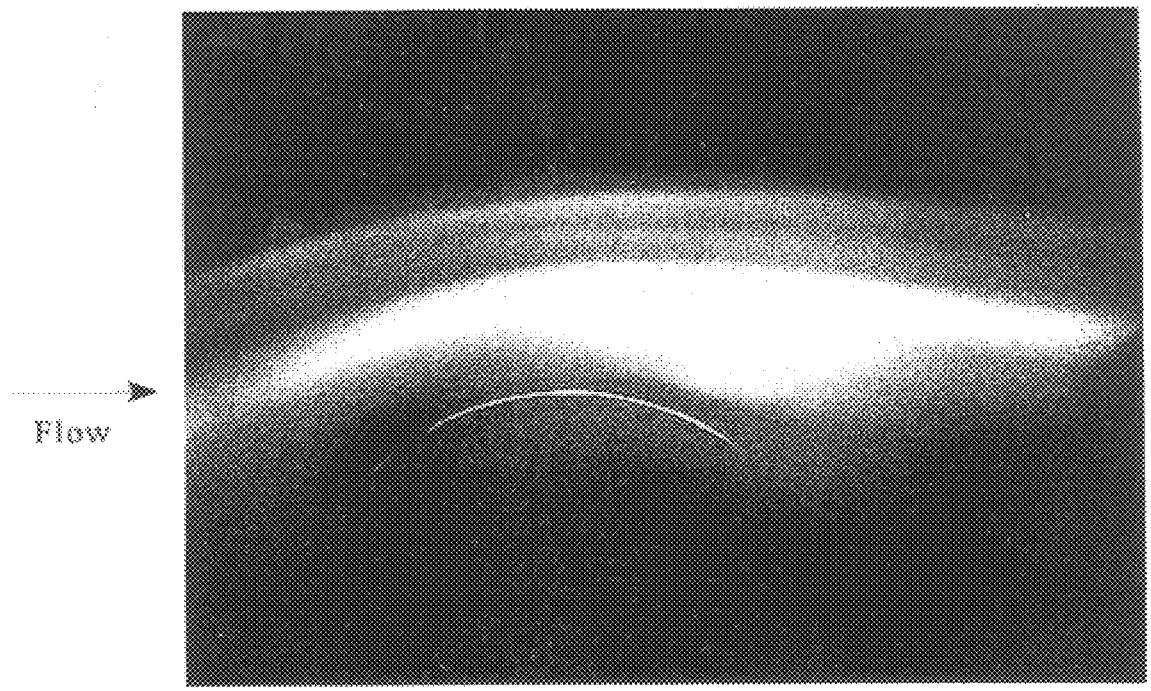
FIG. 10 is a photograph illustrating smoke flow visualization of separation delay for the tripped turbulent flow over a cylinder with a Reynolds number 150,000, where unexcited flow is from left to right.
Figure 11:
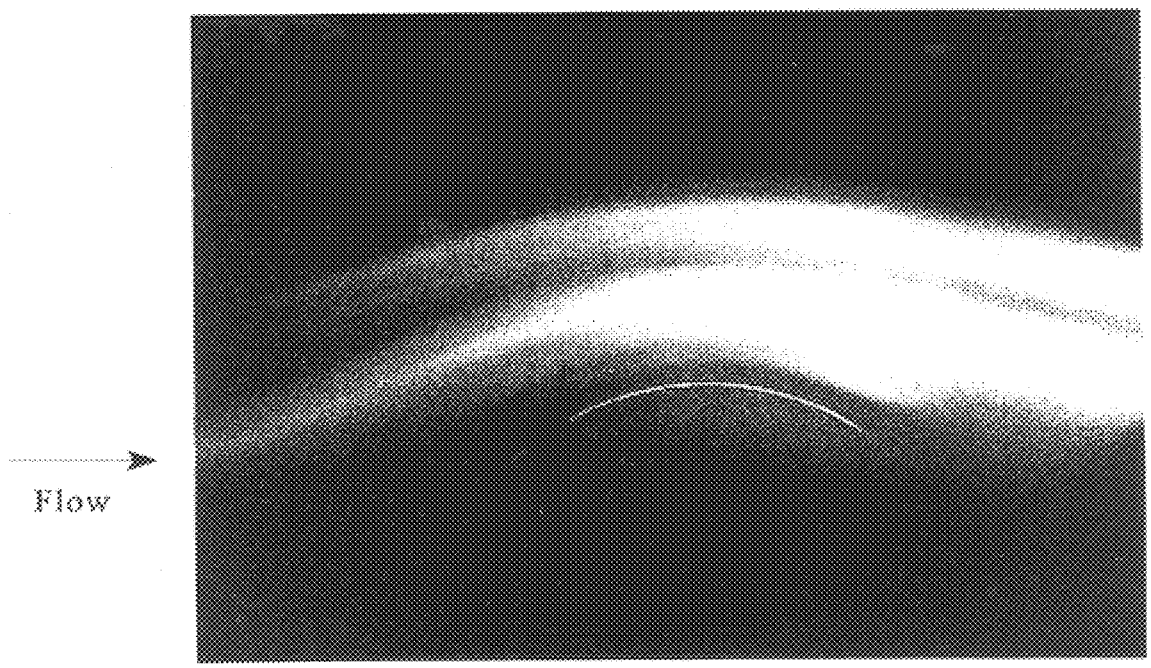
FIG. 11 is a photograph illustrating smoke flow visualization of separation delay for the tripped turbulent flow over the cylinder with a Reynolds number of 150,000, where the flow is from left to right and is excited at 2.25 kHz for angular positions between 72 and 74 degrees.

Since the Reynolds numbers for which changes in flow separation could be detected ranged from 100,000 to 158,000 (the upper limit being dictated by the specifications of the tunnel) it was suspected that the flow separation control system was modifying the laminar-turbulent transition process. Experiments were repeated with a tripped boundary layer. Once again, excitation at 2.25 kHz of the same two strips resulted in a 20% reduction in the pressure drag (FIG. 7). In this case however, the mean pressure in the wake was increased as a result of the excitation.

Initially, it was believed that the acoustic radiation from the flow separation control system was the primary perturbation mechanism. However, subsequent observations have indicated that direct interactions due to surface flexure play a predominant role. The optimum non-dimensional excitation frequency needed for control, expressed as a Strouhal number (St=f×(D/U), where f is the excitation frequency) was 23. This is about an order of magnitude higher compared to similar studies using blowing/suction or external acoustic forcing for control. Smoke flow visualization was used to confirm the earlier studies. A downstream movement of the separation point is seen both in the absence and presence of tripping (see FIGS. 8–11). Flow visualization also showed that the boundary layer responded nearly instantaneously to the excitation. The effects of excitation were found to be reversible. This showed the possibility of using the flow separation control system as a means for switching large energy flows with a relatively small energy input. About 1 micro Watt of electrical power was needed to reduce the drag induced power loss by about 1 Watt in the cylinder experiments.

Figure 12:
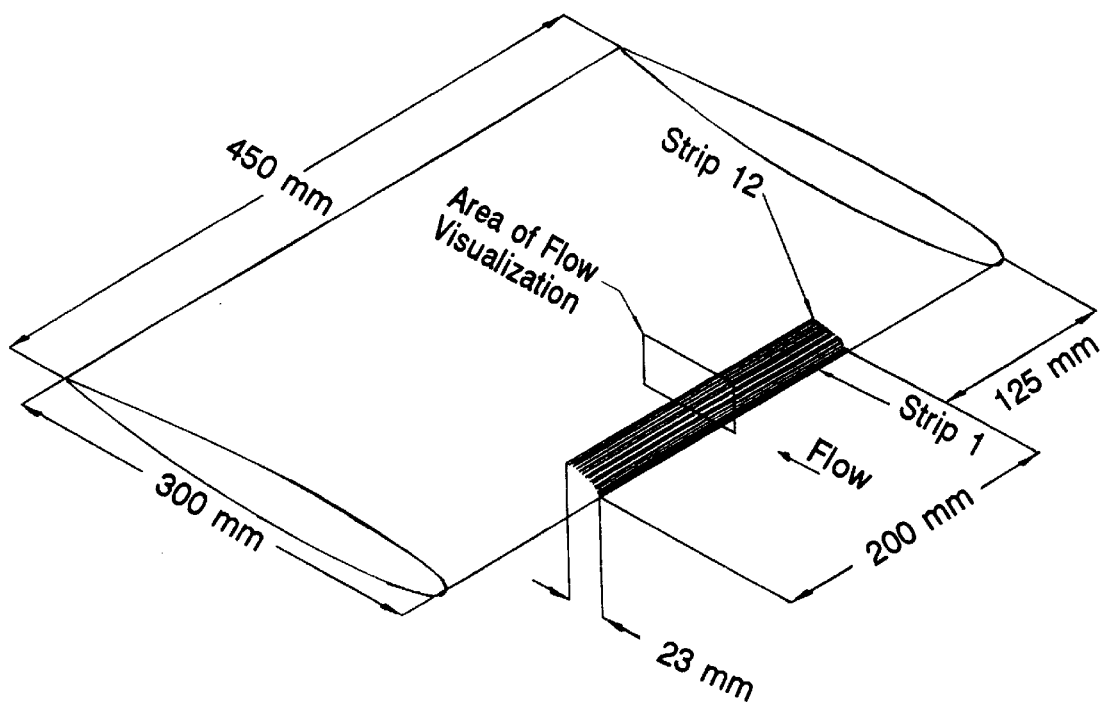
FIG. 12 is a schematic representation of a flexible wall and transducer array configuration of the flow separation control system on a wing section, illustrating a transducer array having twelve 1 mm wide transducer strips spaced 1 mm apart.
Figure 13:
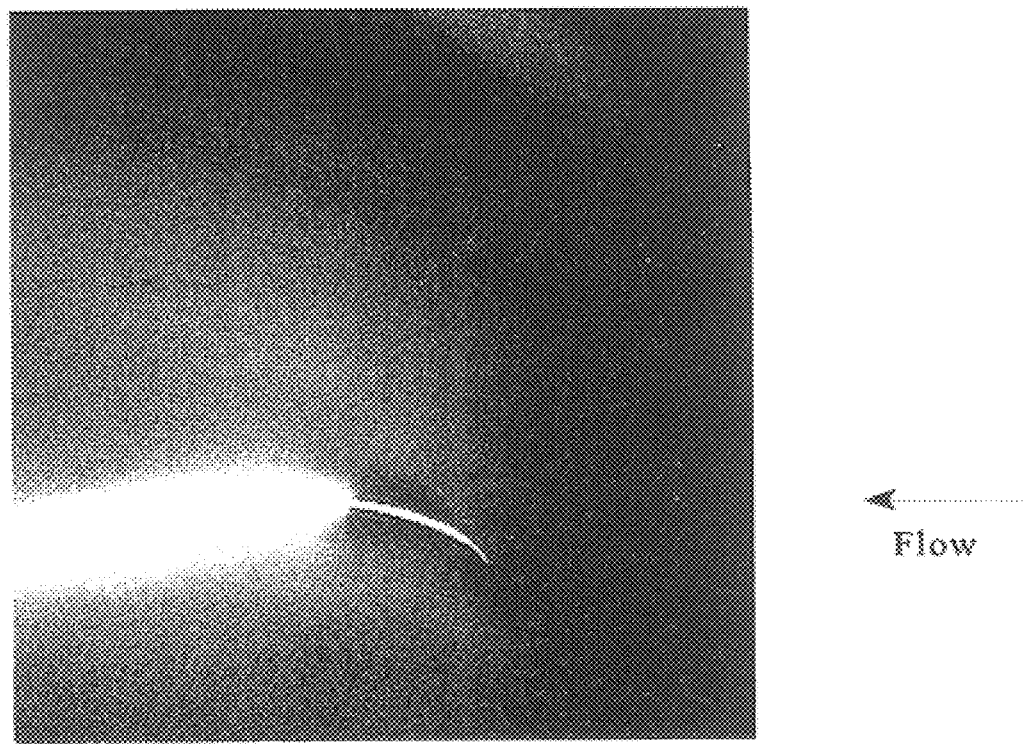
FIG. 13 is a photograph illustrating smoke flow visualization of separated flow near the leading edge of the aircraft wing of FIG. 12, where unexcited flow is from right to left, with a Reynolds number of about 825,000, and an angle of attack is about 14 degrees.
Figure 14:
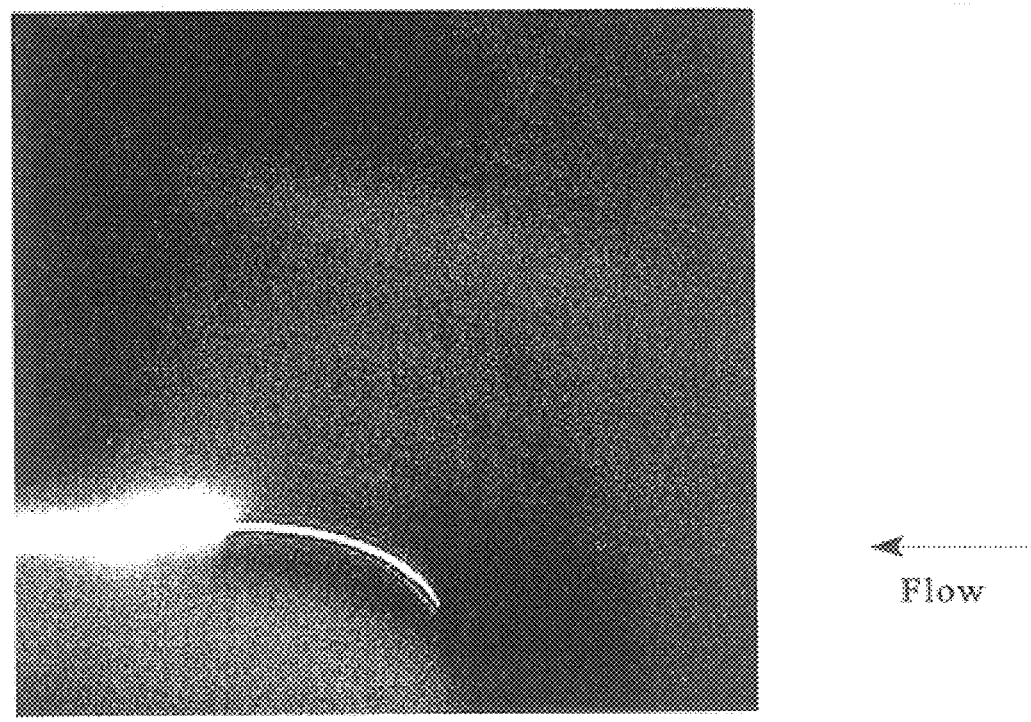
FIG. 14 is a photograph showing smoke flow visualization of reattachment of separated flow near the leading edge of the aircraft wing of FIG. 10, where the flow is from right to left with a Reynolds number of about 825,000, an angle of attack at about 14 degrees, and an excitation source of about 2 kHz is applied to each strip in phase.

The second set of examples involve experiments performed on an NACA 0012 airfoil. FIG. 12 shows a schematic layout of the flow separation control system mounted to the airfoil. In these examples, the transducers indicated multiple peaks in the sensed pressure fluctuations. Since more than one peak was observed in the pressure fluctuation signature, the strips were oscillated at each of these frequencies. The effect on flow separation was observed using smoke flow visualization and hot-film measurements in the wake. Experiments were run in a different subsonic wind tunnel having a maximum speed of about 45 m/s. Results were obtained for chord-based Reynolds numbers of 430,000 and 825,000. Here the Reynolds number (R) is represented by the following equation:

$$R=U\times(C/\nu)$$

where C is the airfoil chord. In both cases, the flow separation control system was able to reattach flows which had just separated. FIGS. 13 and 14 shows the visualization photographs for the higher Reynolds number case.

What is claimed is:

1. An active flow separation control system, comprising:
   a housing having an inner wall mountable to a surface of structure and a flexible outer wall;
   a transducer array mounted to or imbedded in said inner wall, said transducer array having a plurality of transducers having a predefined thickness in a direction of flow and a predefined spacing between adjacent transducers; and
   a controller capable of operating said system in a first mode where said transducer array senses outer wall fluctuations caused by the flow and said sensed fluctuations are processed by said controller to determine a point of occurance of flow separation, and capable of operating in a second mode where said transducers in said array can be individually actuated so as to introduce a low level disturbance into the flow that counteracts flow separation.

2. An active flow separation control system, comprising:
   a housing having an inner wall mountable to an aerodynamic surface and a flexible outer wall;
   a transducer array mounted to or imbedded in said inner wall, said transducer array having a plurality of transducers each having a predefined thickness in a direction of flow and a predefined spacing between adjacent transducers; and
   a controller capable of individually controlling said transducers in said array to generate a desired vibrational mode of at least a portion of said outer wall such that said at least a portion of said outer wall vibrates at a desired frequency, and wherein said outer wall vibrates in response to flow induced fluctuations such that said fluctuation induced vibrations are translated from said transducer array to said controller for determinations of characteristics of flow separation.

3. The system according to claim 2, wherein said disturbances are capable of reattaching a separated boundary layer on streamlined and bluff bodies.

4. The system according to claim 2, wherein said disturbances are capable of reducing the severity of buffeting and the level of unsteadiness in the flow in a wake region.

5. The system according to claim 2, wherein said transducers are alternately activated and deactivated at a rate slower than an excitation frequency for switching a flow between separated and attached states.

6. The system according to claim 5, wherein said transducers are used to impart static directional control.

7. The system according to claim 5, wherein said transducers are used as a flow disturbance amplification device for obtaining relatively low-frequency large-amplitude directional excursions from a relatively higher-frequency low-amplitude low-energy source.

8. The system according to claim 2, wherein said transducers are used as a surface pressure fluctuation sensor for resolving a plurality of measurements spatially and temporally.

9. The system according to claim 8, wherein when said transducers are used as said pressure fluctuation sensor, said transducers determine optimum excitation locations, frequencies, time intervals and modes.

10. The system according to claim 2, wherein said transducers are used as an array of independently distributed low-profile acoustic sources for generating plane acoustic waves and non-plane acoustic waves in an arbitrary direction.

11. The system according to claim 8, wherein when a first portion of said transducers is used as said pressure fluctuation sensor and a second portion of said transducers is used as an array of independently distributed low-profile acoustic sources for generating plane acoustic waves and non-plane acoustic waves in an arbitrary direction, said first and second portions of said transducers cancel or augment acoustic radiation in a region close to said transducers.

12. The system according to claim 2, wherein said transducers are capable of modifying a surface sheer stress, a surface heat transfer coefficient and a surface mass transfer coefficient.

13. The system according to claim 5, wherein said transducers control large scale mixing and small scale mixing of a plurality of fluid streams without being directly exposed to heat and combustion products.

* * * * *